United States Patent
Yang et al.

(10) Patent No.: US 9,832,505 B2
(45) Date of Patent: Nov. 28, 2017

(54) METHOD FOR INSERTING AN ADVERTISEMENT INTO A VIDEO STREAM OF AN APPLICATION ON DEMAND (AOD) SERVICE, AOD PROCESSING DEVICE AND AOD SERVER

(71) Applicant: TELEFONAKTIEBOLAGET LM ERICSSON (PUBL), Stockholm (SE)

(72) Inventors: Arnold Yang, Shanghai (CN); Shaheer Jamal-Syed, Shanghai (CN); Shiyuan Xiao, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/027,392

(22) PCT Filed: Sep. 24, 2013

(86) PCT No.: PCT/CN2013/084048
§ 371 (c)(1),
(2) Date: Apr. 5, 2016

(87) PCT Pub. No.: WO2015/042767
PCT Pub. Date: Apr. 2, 2015

(65) Prior Publication Data
US 2016/0255387 A1  Sep. 1, 2016

(51) Int. Cl.
*H04N 21/2668* (2011.01)
*H04N 21/234* (2011.01)
(Continued)

(52) U.S. Cl.
CPC ..... *H04N 21/2668* (2013.01); *H04N 21/2387* (2013.01); *H04N 21/2393* (2013.01);
(Continued)

(58) Field of Classification Search
CPC ......... H04N 21/2668; H04N 21/23412; H04N 21/23424; H04N 21/2387; H04N 21/2393;
(Continued)

(56) References Cited

U.S. PATENT DOCUMENTS

| 2002/0147645 | A1* | 10/2002 | Alao | H04N 21/2343 |
| | | | | 705/14.54 |
| 2007/0157228 | A1* | 7/2007 | Bayer | H04N 21/25891 |
| | | | | 725/34 |

(Continued)

FOREIGN PATENT DOCUMENTS

| CN | 101179739 A | 5/2008 |
| CN | 101360234 A | 2/2009 |

OTHER PUBLICATIONS

International Search Report and Written Opinion dated Jun. 23, 2014, in International Application No. PCT/CN2013/084048, 11 pages.

*Primary Examiner* — Randy Flynn
(74) *Attorney, Agent, or Firm* — Rothwell, Figg, Ernst, & Manbeck, P.C.

(57) ABSTRACT

The disclosure provides a method (300) for inserting an advertisement into a video stream of an AoD service. The method is performed by an AoD processing device and includes steps of: acquiring (S310), from the AoD server, advertisement configuration information; determining (S320) an advertisement to be inserted based on the advertisement configuration information; receiving (S330), from the AoD server, a notification that a triggering condition for inserting an advertisement is satisfied, the triggering condition being associated with an interaction between the AoD server and a client device to which the AoD service is provided; transmitting (S340) to the AoD server an instruction to cause the AoD server to render a combined picture of (Continued)

the application and the advertisement based on the advertisement configuration information; and receiving (S350), from the AoD server, the combined picture and converting it into a frame in the video stream for transmission to the client device.

24 Claims, 11 Drawing Sheets

(51) Int. Cl.
*H04N 21/2387* (2011.01)
*H04N 21/239* (2011.01)
*H04N 21/2547* (2011.01)
*H04N 21/2665* (2011.01)
*H04N 21/478* (2011.01)
*H04N 21/6587* (2011.01)
*H04N 21/81* (2011.01)
*H04N 21/8545* (2011.01)

(52) U.S. Cl.
CPC . *H04N 21/23412* (2013.01); *H04N 21/23424* (2013.01); *H04N 21/2547* (2013.01); *H04N 21/2665* (2013.01); *H04N 21/4781* (2013.01); *H04N 21/6587* (2013.01); *H04N 21/812* (2013.01); *H04N 21/8173* (2013.01); *H04N 21/8545* (2013.01)

(58) Field of Classification Search
CPC ........... H04N 21/2547; H04N 21/2665; H04N 21/4781; H04N 21/6587; H04N 21/812; H04N 21/8173; H04N 21/8545
See application file for complete search history.

(56) References Cited

U.S. PATENT DOCUMENTS

| | | | |
|---|---|---|---|
| 2009/0006375 A1* | 1/2009 | Lax | H04N 21/435 |
| 2009/0049090 A1* | 2/2009 | Shenfield | G06Q 30/02 |
| 2009/0106104 A1* | 4/2009 | Upendran | H04N 21/458 |
| | | | 705/14.5 |
| 2009/0204664 A1 | 8/2009 | Yovin et al. | |
| 2010/0076851 A1* | 3/2010 | Jewell, Jr. | G06Q 30/0271 |
| | | | 705/14.67 |
| 2010/0332330 A1* | 12/2010 | Goel | G06Q 30/02 |
| | | | 705/14.66 |
| 2011/0225607 A1 | 9/2011 | Smith et al. | |
| 2012/0047019 A1* | 2/2012 | Choi | G06Q 30/0267 |
| | | | 705/14.64 |

* cited by examiner

METHOD FOR INSERTING AN ADVERTISEMENT INTO A VIDEO STREAM OF AN APPLICATION ON DEMAND (AOD) SERVICE, AOD PROCESSING DEVICE AND AOD SERVER

CROSS REFERENCE TO RELATED APPLICATION(S)

This application is a 35 U.S.C. §371 National Phase Entry Application from PCT/CN2013/084048, filed Sep. 24, 2013, designating the United States, the disclosure of which is incorporated herein in its entirety by reference.

TECHNICAL FIELD

The disclosure generally relates to Application on Demand (AoD) techniques, and more particularly, to a method for inserting an advertisement into a video stream of an AoD service, an AoD processing device, an AoD server as well as associated computer programs and computer program products.

BACKGROUND

With the development of wired and wireless communication technologies in terms of bandwidth and delay, especially with the deployment of the Long Term Evolution (LTE) systems, it is now possible to provide an application in a form of a video stream to a client device on a user's demand and to respond to the user's operations in real time. This is referred to as Application on Demand (AoD) service. The AoD service has a number of advantages. For example, applications are installed and executed on an AoD server instead of on a user device, such as an IPTV receiver, a mobile phone, a tablet computer or the like, whose processing capability and storage capacity are typically limited. In addition, it is much easier to update applications and protect their copyrights on the AoD server than on the user device. Here examples of the applications include office applications, enterprise vertical applications, games, etc.

As in traditional TV broadcast services, service providers typically desire to insert advertisements into AoD services. Picture in Picture (PiP) is a well known feature in the traditional TV broadcast services for presenting an advertisement to a user during TV program broadcasting. The PiP technique requires separate video processing devices for the advertisement and the TV program. Further, the video streams of the advertisement and the TV program are transmitted in separate channels and then combined at TV receivers. Hence, the PiP technique requires dedicated video processing devices and dedicated transmission channel for the advertisement.

WO 2011/075876 discloses a method for implementing PiP in an Internet Protocol (IP)-based mobile TV system. In the method, two separate channels (streaming sessions) are set up for streaming separate contents to a receiver, which then renders both contents on a screen at the same time. It can be seen that this PiP solution also requires separate channels for transmission of separate contents to be combined at the receiver.

There is thus a need for an improved solution for inserting an advertisement into a video stream of an AoD service.

SUMMARY

It is an object of the disclosure to provide a method for inserting an advertisement into a video stream of an AoD service, an AoD processing device, an AoD server as well as associated computer programs and computer program products, capable of transmitting the video content of the advertisement without a dedicated channel, thereby enabling the reduction of both bandwidth requirement and signaling overhead when compared with the traditional PiP technique.

According to a first aspect of the disclosure, a method for inserting an advertisement into a video stream of an AoD service is provided. The AoD service is associated with an application hosted on an AoD server. The method is performed by an AoD processing device and includes steps of: acquiring, from the AoD server, advertisement configuration information; determining an advertisement to be inserted based on the advertisement configuration information; receiving, from the AoD server, a notification that a triggering condition for inserting an advertisement is satisfied, the triggering condition being associated with an interaction between the AoD server and a client device to which the AoD service is provided; transmitting to the AoD server an instruction to cause the AoD server to render a combined picture of the application and the advertisement based on the advertisement configuration information; and receiving, from the AoD server, the combined picture and converting it into a frame in the video stream for transmission to the client device.

In an embodiment, the advertisement configuration information specifies an area in a picture of the application where a picture of the advertisement is to be inserted, and the combined picture is rendered by replacing the area in the picture of the application with the picture of the advertisement.

In an embodiment, the area is represented by coordinates in pixels, width and height.

In an embodiment, the triggering condition is satisfied when: the application is paused by the client device and waits for an input from the client device; the application is loaded or reloaded in response to an interaction with the client device; or an ending picture of the application is to be rendered in response to an interaction with the client device.

In an embodiment, the advertisement is determined further based on a priority dependent on a price its advertiser is willing to pay and/or an associated click-through rate.

In an embodiment, the AoD processing device and the AoD server are implemented on a single physical entity.

In an embodiment, the AoD processing device and the AoD server are implemented on separate physical entities.

According to a second aspect of the disclosure, a method for inserting an advertisement into a video stream of an AoD service is provided. The AoD service is associated with an application hosted on an AoD server. The method is performed by the AoD server and includes steps of: detecting and notifying to an AoD processing device that a triggering condition for inserting an advertisement is satisfied, the triggering condition being associated with an interaction between the AoD server and a client device to which the AoD service is provided; obtaining an advertisement to be inserted; rendering a combined picture of the application and the advertisement; and transmitting the combined picture to the AoD processing device such that it is converted into a frame in the video stream for transmission to the client device.

In an embodiment, the rendering step is performed based on advertisement configuration information specifying an area in a picture of the application where a picture of the advertisement is to be inserted, and the rendering step includes replacing the area in the picture of the application with the picture of the advertisement.

In an embodiment, the area is represented by coordinates in pixels, width and height.

In an embodiment, the triggering condition is satisfied when: the application is paused by the client device and waits for an input from the client device; the application is loaded or reloaded in response to an interaction with the client device; or an ending picture of the application is to be rendered in response to an interaction with the client device.

According to a third aspect of the disclosure, an AoD processing device is provided. The AoD processing device includes a processor and a memory. The memory contains instructions executable by the processor whereby the AoD processing device is operative to insert an advertisement into a video stream of an AoD service associated with an application hosted on an AoD server by: acquiring, from the AoD server, advertisement configuration information; determining an advertisement to be inserted based on the advertisement configuration information; receiving, from the AoD server, a notification that a triggering condition for inserting an advertisement is satisfied, the triggering condition being associated with an interaction between the AoD server and a client device to which the AoD service is provided; transmitting to the AoD server an instruction to cause the AoD server to render a combined picture of the application and the advertisement based on the advertisement configuration information; and receiving, from the AoD server, the combined picture and converting it into a frame in the video stream for transmission to the client device.

According to a fourth aspect of the disclosure, an AoD server is provided. The AoD server includes a processor and a memory. The memory contains instructions executable by the processor whereby the AoD server is operative to insert an advertisement into a video stream of an AoD service associated with an application hosted on the AoD server by: detecting and notifying to an AoD processing device that a triggering condition for inserting an advertisement is satisfied, the triggering condition being associated with an interaction between the AoD server and a client device to which the AoD service is provided; obtaining an advertisement to be inserted; rendering a combined picture of the application and the advertisement; and transmitting the combined picture to the AoD processing device such that it is converted into a frame in the video stream for transmission to the client device.

According to a fifth aspect of the disclosure, an apparatus for inserting an advertisement into a video stream of an AoD service is provided. The AoD service is associated with an application hosted on an AoD server. The apparatus includes: means for acquiring, from the AoD server, advertisement configuration information; means for determining an advertisement to be inserted based on the advertisement configuration information; means for receiving, from the AoD server, a notification that a triggering condition for inserting an advertisement is satisfied, the triggering condition being associated with an interaction between the AoD server and a client device to which the AoD service is provided; means for transmitting to the AoD server an instruction to cause the AoD server to render a combined picture of the application and the advertisement based on the advertisement configuration information; and means for receiving, from the AoD server, the combined picture and converting it into a frame in the video stream for transmission to the client device.

According to a sixth aspect of the disclosure, an apparatus for inserting an advertisement into a video stream of an AoD service is provided. The AoD service is associated with an application hosted on an AoD server. The apparatus includes: means for detecting and notifying to an AoD processing device that a triggering condition for inserting an advertisement is satisfied, the triggering condition being associated with an interaction between the AoD server and a client device to which the AoD service is provided; means for obtaining an advertisement to be inserted; means for rendering a combined picture of the application and the advertisement; and means for transmitting the combined picture to the AoD processing device such that it is converted into a frame in the video stream for transmission to the client device.

According to a seventh aspect of the disclosure, a computer program is provided. The computer program includes computer readable instructions which, when run on an AoD processing device, cause the AoD processing device to insert an advertisement into a video stream of an AoD service associated with an application hosted on an AoD server, by: acquiring, from the AoD server, advertisement configuration information; determining an advertisement to be inserted based on the advertisement configuration information; receiving, from the AoD server, a notification that a triggering condition for inserting an advertisement is satisfied, the triggering condition being associated with an interaction between the AoD server and a client device to which the AoD service is provided; transmitting to the AoD server an instruction to cause the AoD server to render a combined picture of the application and the advertisement based on the advertisement configuration information; and receiving, from the AoD server, the combined picture and converting it into a frame in the video stream for transmission to the client device.

According to an eighth aspect of the disclosure, a computer program product is provided. The computer program product includes computer readable storage means storing the computer program according to the above seventh aspect.

According to a ninth aspect of the disclosure, a computer program is provided. The computer program includes computer readable instructions which, when run on an AoD server, cause the AoD server to insert an advertisement into a video stream of an AoD service associated with an application hosted on the AoD server by: detecting and notifying to an AoD processing device that a triggering condition for inserting an advertisement is satisfied, the triggering condition being associated with an interaction between the AoD server and a client device to which the AoD service is provided; obtaining an advertisement to be inserted; rendering a combined picture of the application and the advertisement; and transmitting the combined picture to the AoD processing device such that it is converted into a frame in the video stream for transmission to the client device.

According to a tenth aspect of the disclosure, a computer program product is provided. The computer program product includes computer readable storage means storing the computer program according to the above ninth aspect.

With the embodiments of the disclosure, the advertisement to be inserted is determined based on the advertisement configuration information. When the triggering condition for inserting an advertisement, which is associated with an interaction between the AoD server and the client device, is satisfied, the application is instructed to render a combined picture of the application and the advertisement based on the advertisement configuration information. Finally, the combined picture is converted into a frame in the video stream for transmission to the client device. In this way, the rendering capability of the application itself is fully utilized to generate combined pictures of the application and the advertisement. Thus, no dedicated video processing device is required for inserting the advertisement. Also, the combined pictures are converted into frames for transmission to the client device. That is, the video contents of the advertisement and the application can be transmitted in a single channel. Thus, no dedicated channel is required for transmitting the video content of the advertisement and both bandwidth requirement and signaling overhead can be reduced when compared with the traditional PiP technique. Additionally, since the triggering condition for inserting the advertisement is associated with the interaction between the AoD server and the client device, it is possible to present the advertisement to the user at an appropriate timing.

BRIEF DESCRIPTION OF THE DRAWINGS

The above and other objects, features and advantages will be more apparent from the following description of embodiments with reference to the figures, in which.

DETAILED DESCRIPTION

Figure 1:
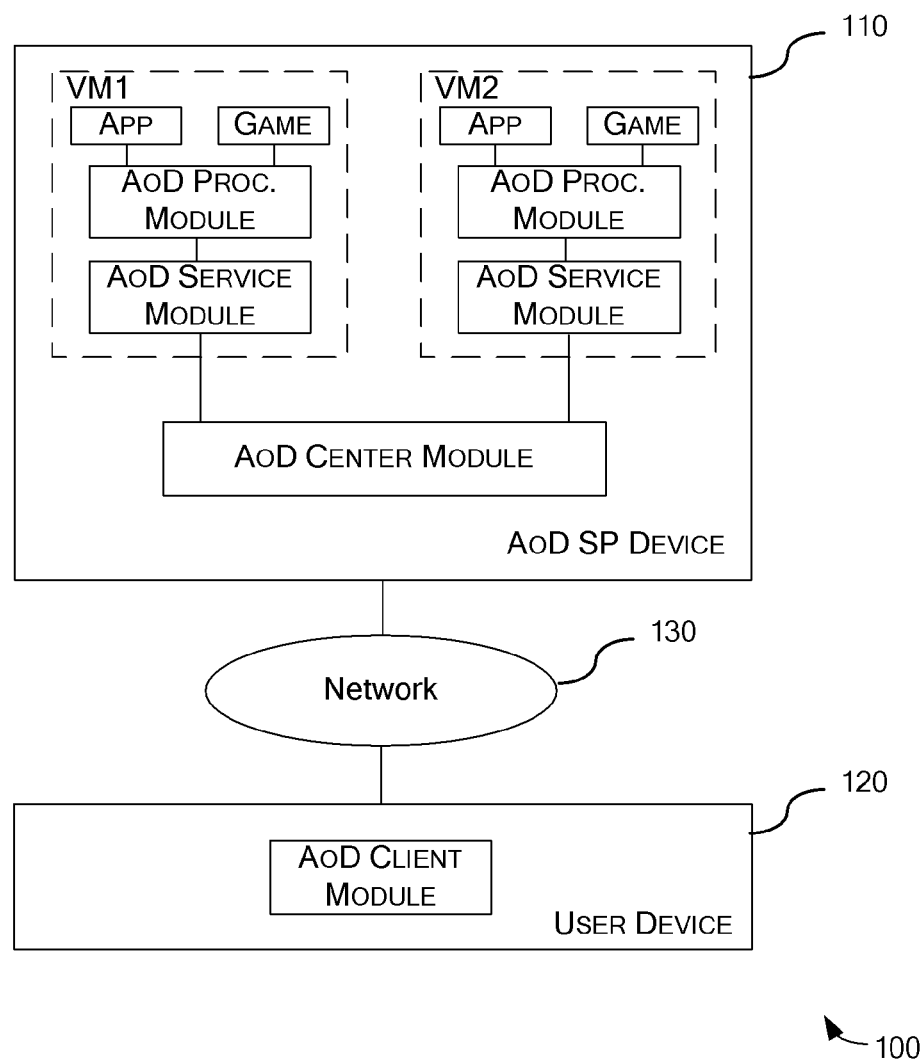
FIG. 1 is a schematic diagram of an example AoD system according to the prior art.

FIG. 1 is a schematic diagram of an example AoD scenario 100 according to the prior art. As shown in FIG. 1, the AoD scenario 100 includes an AoD Service Provider (SP) device 110 and a user device 120 connected with each other via a network 130. The AoD SP device 110 hosts an AoD center module that manages a number of AoD service modules and assigns one of them to the user device 120 in response to a request from the user device 120. Each AoD service module can be implemented in a Virtual Machine (VM). Each VM also includes one or more applications and an AoD processing module. It is also possible that the AoD center module, the AoD service modules and/or the AoD processing module can be implemented in hardware. The functions of the AoD service module and the AoD processing module will be described hereafter. The user device 120 hosts an AoD client module corresponding to the AoD service module. The user device 120 can be, for example, an IPTV set top box, a smart phone or a tablet computer and can be connected to the network 130 via a wired or wireless link.

Figure 2:
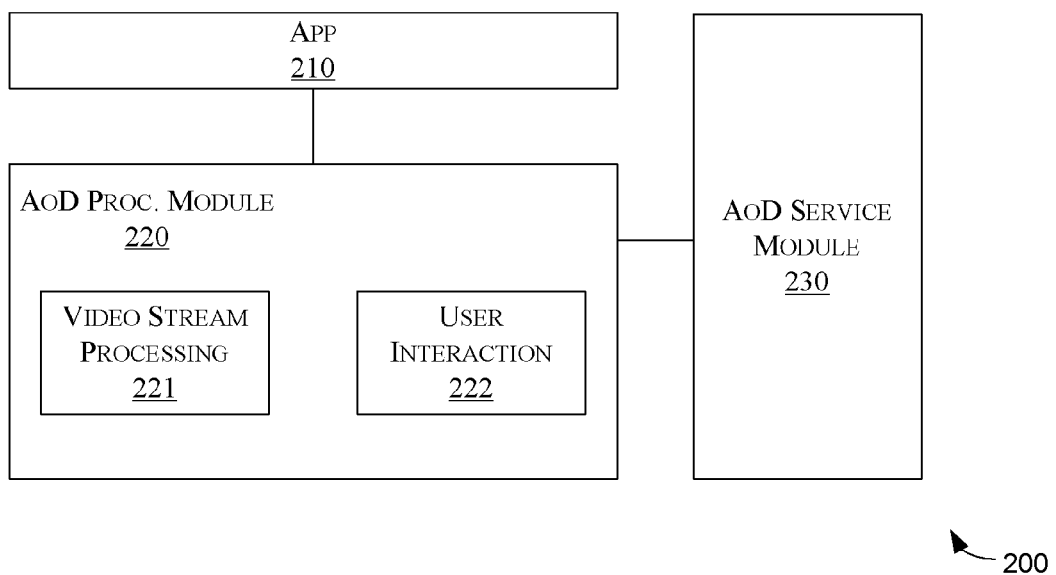
FIG. 2 is a schematic diagram showing a functional architecture of the AoD system of FIG. 1.

FIG. 2 is a schematic diagram showing a functional architecture 200 of the AoD SP device of FIG. 1. As shown, an application 210 provides its video pictures to an AoD processing module 220. The AoD processing module 220 includes a video stream processing unit 221 and a user interaction unit 222. The video stream processing unit 221 receives the video pictures from the application 210 and converts them into frames in a video stream for transmission to an AoD client module at a user device (not shown). For example, the video stream processing unit 221 can compress and/or encrypt the frames according to any appropriate video encoding standard such as MPEG4, H.264 or H.265. Also, the video stream processing unit 221 may include an audio codec such as Adaptive Multi-Rate (AMR) or Advanced Audio Coding (ACC) for processing audio data contained in the video stream. The user interaction unit 222 functions as an intermediate for interactions between the application 210 and the AoD client module. An AoD service module 230 controls the overall operations associated with an AoD service. For example, the AoD service module 230 creates an application instance in response to a request from the AoD client module and initiates the AoD processing module 220.

Figure 3:
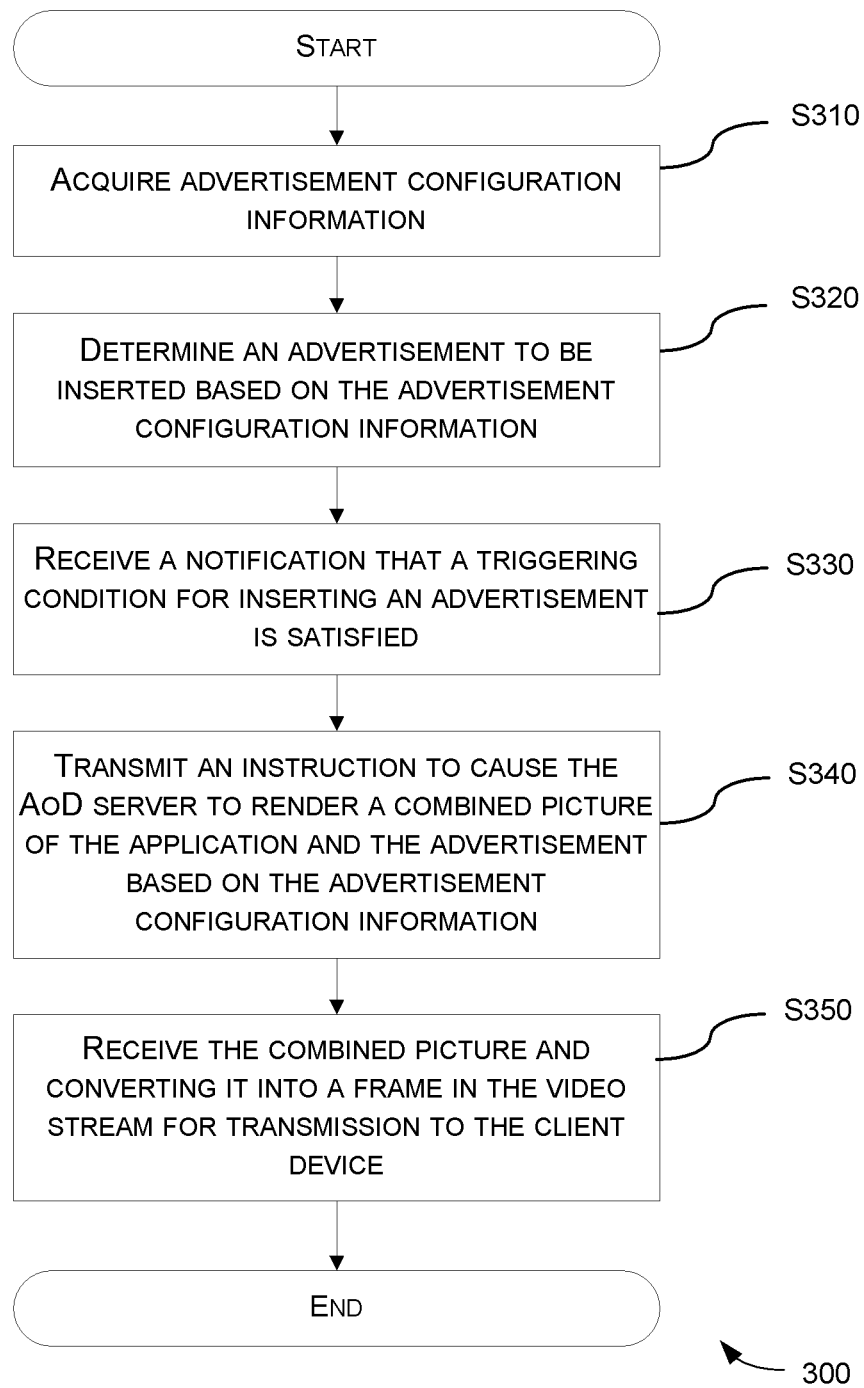
FIG. 3 is a flowchart illustrating a method for inserting an advertisement according to an embodiment of the disclosure.

FIG. 3 is a flowchart illustrating a method 300 for inserting an advertisement into a video stream of an Application on Demand (AoD) service according to an embodiment of the disclosure. Here the AoD service is associated with an application hosted on an AoD server. The method 300 can be performed by an AoD processing device. The AoD processing device and the AoD server can be implemented on a single physical entity or on separate physical entities. The method 300 includes the following steps.

At step S310, the AoD processing device acquires advertisement configuration information from the AoD server.

In an embodiment, the advertisement configuration information specifies an area in a picture of the application where a picture of the advertisement is to be inserted. As a non-limiting example, the area can be a rectangular area. In this case, the area can be represented by coordinates in pixels, width and height. For example, the area can be represented by the pixel coordinates of its upper left corner and its width and height. Alternatively, the area can be represented by the pixel coordinates of its upper left corner and bottom right corner. As an example, the advertisement configuration information may have the following format:

```
<app uid="UserA" name="AppA">
    ...
    <coordinateX>0</coordinateX>
    <coordinateY>0</coordinateY>
    <adWidth>100</adWidth>
    <adHeight>60</adHeight>
    ...
</app>
``` where <coordinateX> and <coordinateY> denote the X-axis (horizontal axis) and Y-axis (vertical axis) coordinates of the area where the picture of the advertisement is to be inserted, respectively, and <adWidth> and <adHeight> denote the width and height of the area, respectively.

At step S320, the AoD processing device determines an advertisement to be inserted based on the advertisement configuration information.

For example, the AoD processing device can search an advertisement database for an advertisement having an appropriate size and/or resolution to be inserted in the area specified by the advertisement configuration information. In an embodiment, the AoD processing device can determine the advertisement to be inserted further based on a priority dependent on a price its advertiser is willing to pay and/or an associated click-through rate. A high priority will be given to an advertisement if its advertiser is willing to pay a high price. Additionally or alternatively, a high priority will be given to an advertisement if it has a high click-through rate in a past time period.

At step S330, the AoD processing device receives from the AoD server a notification that a triggering condition for inserting an advertisement is satisfied. The triggering condition is associated with an interaction between the AoD server and a client device to which the AoD service is provided. As an example, the notification may be implemented as a message based on HTTP POST method having the following format:

```
<message method="POST">
    <triggeringNotification>1</triggeringNotification >
</message>
``` where <triggeringNotification> denotes the notification that a triggering condition for inserting an advertisement is satisfied.

In an embodiment, the triggering condition is satisfied when the application is paused by the client device and waits for an input from the client device. In another embodiment, the triggering condition is satisfied when the application is loaded or reloaded in response to an interaction with the client device. In yet another embodiment, the triggering condition is satisfied when an ending picture of the application is to be rendered in response to an interaction with the client device.

At step S340, the AoD processing device transmits to the AoD server an instruction to cause the AoD server to render a combined picture of the application and the advertisement based on the advertisement configuration information. As an example, the instruction may be implemented as a message based on HTTP POST method having the following format:

```
<message method="POST">
    <renderingInstruction>1</renderingInstruction>
    <adName>AdFileName.mp4</adName>
    <adContentURL>http://<content server
address>:<port>/folder/<adContentURL>
</message>
``` where <renderingInstruction> denotes the instruction, <adName> denotes the name of the video file of the advertisement, and <adContentURL> denotes the Universal Resource Locator of the address where the video file is stored.

Figure 4:
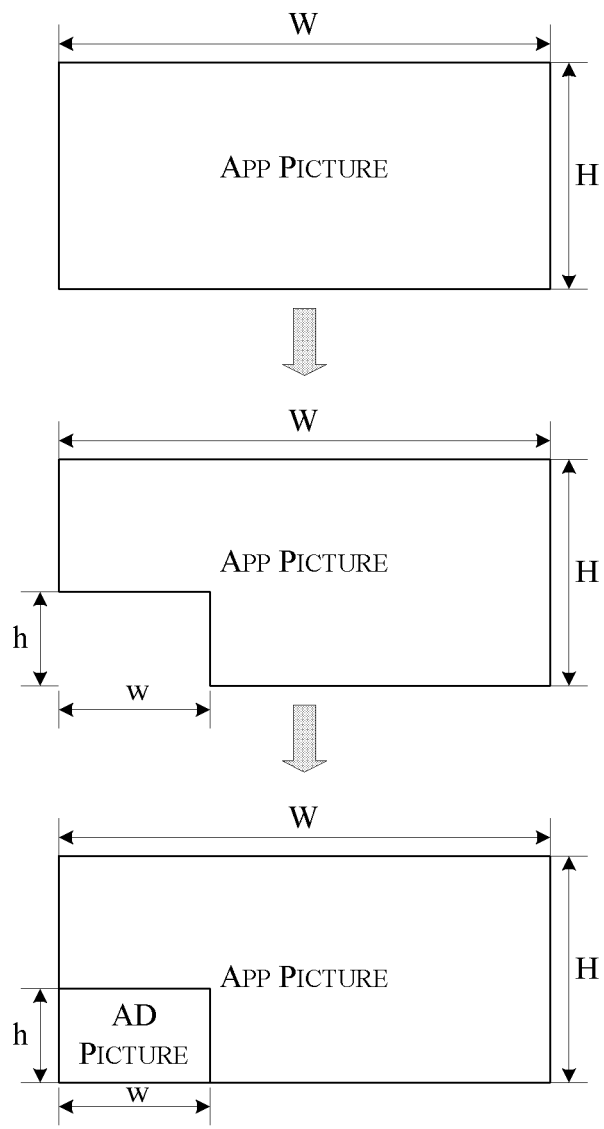
FIG. 4 is a schematic diagram showing an example rendering process according to an embodiment of the disclosure.

An example rendering process will be explained with reference to FIG. 4. In this example, as shown in the upper graph of FIG. 4, the picture of the application has a width of W and a height of H (e.g., both in units of pixels). It is specified in the advertisement configuration information that the area where the picture of the advertisement is to be inserted has a width of w and a height of h, as shown in the middle graph. The combined picture can be rendered by the AoD server by rendering the picture of the application, rendering the picture of the advertisement and replacing the area in the picture of the application with the picture of the advertisement, as shown in the lower graph. Alternatively, the combined picture can be rendered by the AoD server directly from the video contents of the application and the advertisement, without rendering the picture of the application and the picture of the advertisement separately.

Figure 5:
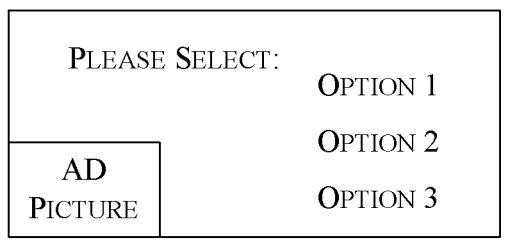
FIG. 5 is a schematic diagram showing examples of combined pictures according to an embodiment of the disclosure.
Figure 5:
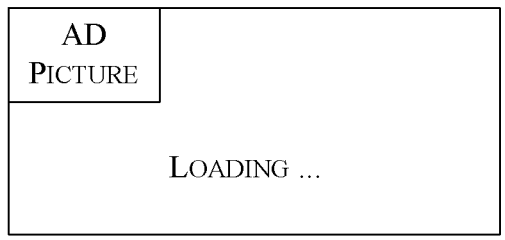
Figure 5:
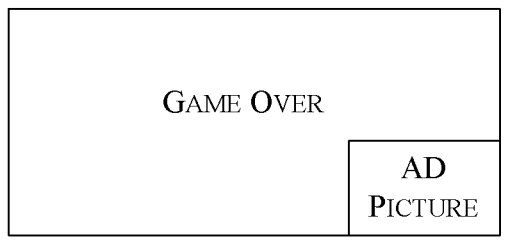

Examples of combined pictures are given in FIG. 5. In the example shown in the upper graph, the application is paused by the user and waits for a selection input from the user. At this time, the AoD processing device receives, from the AoD server on which the application runs, a notification that the triggering condition for inserting an advertisement is satisfied and then instructs the AoD server to render a combined picture as shown in the upper graph. The middle graph shows a combined picture when the application is being loaded in response to an interaction with the user. The lower graph shows a combined picture when an ending picture of the application is rendered in response to an interaction with the client device.

At step S350, the AoD processing device receives from the AoD server the combined picture and converts it into a frame in the video stream for transmission to the client device.

Figure 6:
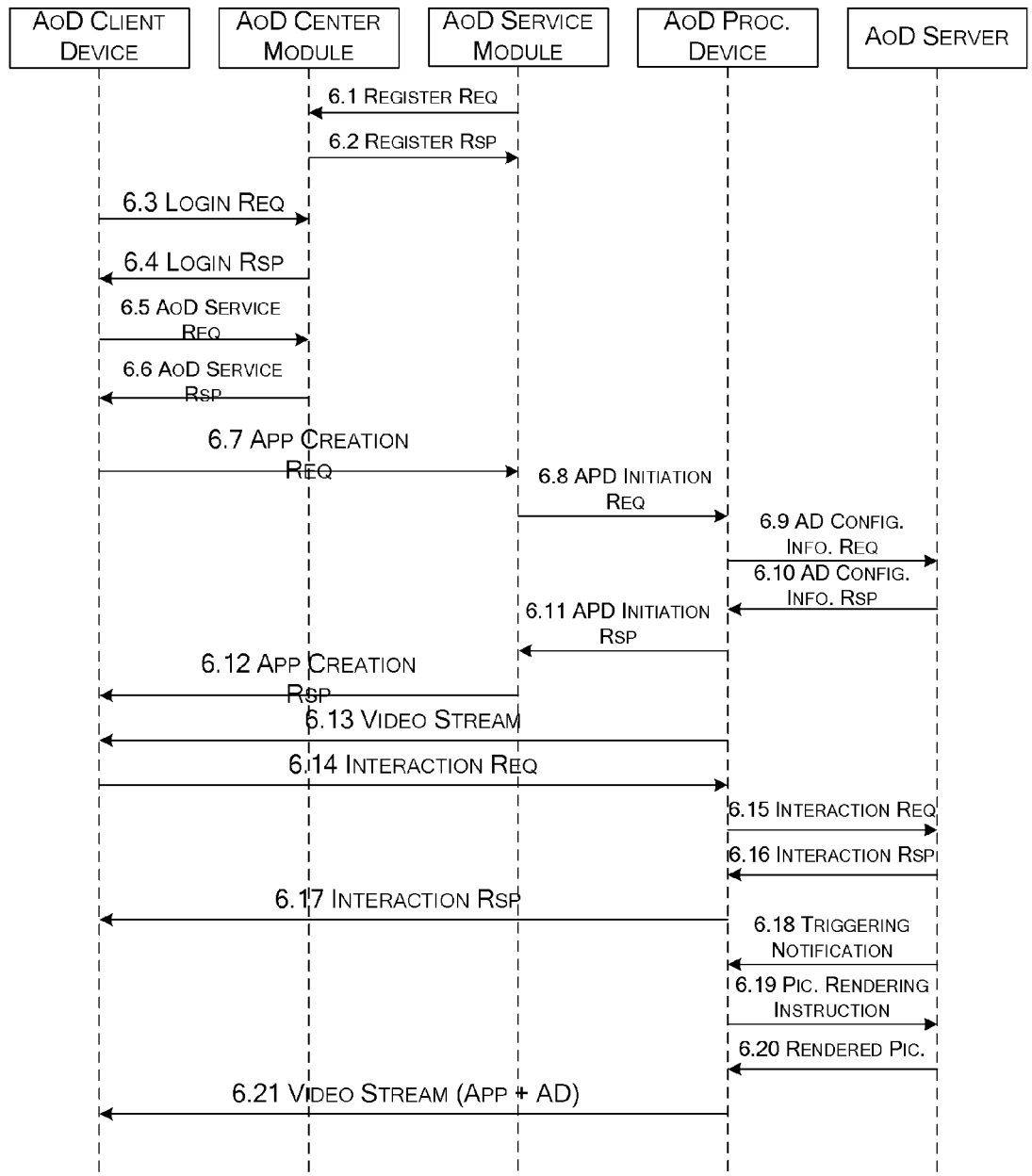
FIG. 6 is a sequence chart illustrating an example of signalling interactions according to an embodiment of the disclosure.

The above method will be described in further detail with reference to FIG. 6, which is a sequence chart illustrating an example of signalling interactions. The AoD center module and the AoD service module in FIG. 6 are similar to those shown in FIGS. 1 and 2 and they can be implemented in hardware or software. The messages used in FIG. 6 can be implemented based on, for example but not limited to, Restful HTTP protocol.

At 6.1, the AoD service module requests to register with the AoD center module. At 6.2, the AoD center module responds with an acknowledgement. Here the request at 6.1 can be implemented using a message based on HTTP POST method and the response at 6.2 can be implemented using a message based on HTTP 200 OK status code. At 6.3, the AoD client device requests to log in to the AoD center module. At 6.4, the AoD center module responds with an acknowledgement. Here the request at 6.3 can be implemented using a message based on HTTP POST method and the response at 6.4 can be implemented using a message based on HTTP 200 OK status code. At 6.5, the AoD client device requests information on AoD services from the AoD center module. At 6.6, the AoD center module responds with the information on AoD services, e.g. by providing a list of applications. Here the request at 6.5 can be implemented using a message based on HTTP GET method and the response at 6.6 can be implemented using a message based on HTTP 200 OK status code.

At 6.7, the AoD client device selects an application from the list and requests to create an application instance at the AoD server. At 6.8, the AoD service module requests to initiate the AoD processing device. At 6.9, the AoD processing device requests advertisement configuration information from the AoD server. At 6.10, the AoD server responds to the AoD processing device with the advertisement configuration information. At 6.11, the AoD processing device responds to the AoD service module with an acknowledgement of its initiation. At 6.12, the AoD service module responds to the AoD client device with an acknowledgement of application creation. Here, the requests at 6.7 and 6.8 can be implemented using messages based on HTTP POST method and the responses at 6.11 and 6.12 can be implemented using messages based on HTTP 200 OK status code. The request at 6.9 can be implemented using a message based on HTTP GET method and the response at 6.10 can be implemented using a message based on HTTP 200 OK status code.

At 6.13, the AoD processing device receives pictures of the application from the AoD server and sends a video stream to the AoD client device, e.g. encoded according to any known or future video protocol, such as Mpeg 4, H.264 and the emerging H.265.

At 6.14, the AoD client device sends an interaction request to the AoD processing device, which then forwards it to the AoD server at 6.15. At 6.16, the AoD processing device receives an interaction response from the AoD server and forwards it to the AoD client device at 6.17. Here, the requests at 6.14 and 6.15 can be implemented using messages based on HTTP POST method and the responses at 6.16 and 6.17 can be implemented using messages based on HTTP 200 OK status code.

At 6.18, the AoD server notifies to the AoD processing device that the triggering condition for inserting an advertisement is satisfied. In response, at 6.19, the AoD processing device sends to the AoD server an instruction to render combined pictures of the application and the advertisement. Here, the notification at 6.18 can be implemented using a message based on HTTP POST method and the instruction at 6.19 can be implemented using a message based on HTTP 200 OK status code.

At 6.20, the AoD processing device receives the combined pictures from the AoD server. Finally at 6.21, the AoD processing device converts the combined pictures into frames in the video stream and sends the video stream to the AoD client device.

Figure 7:
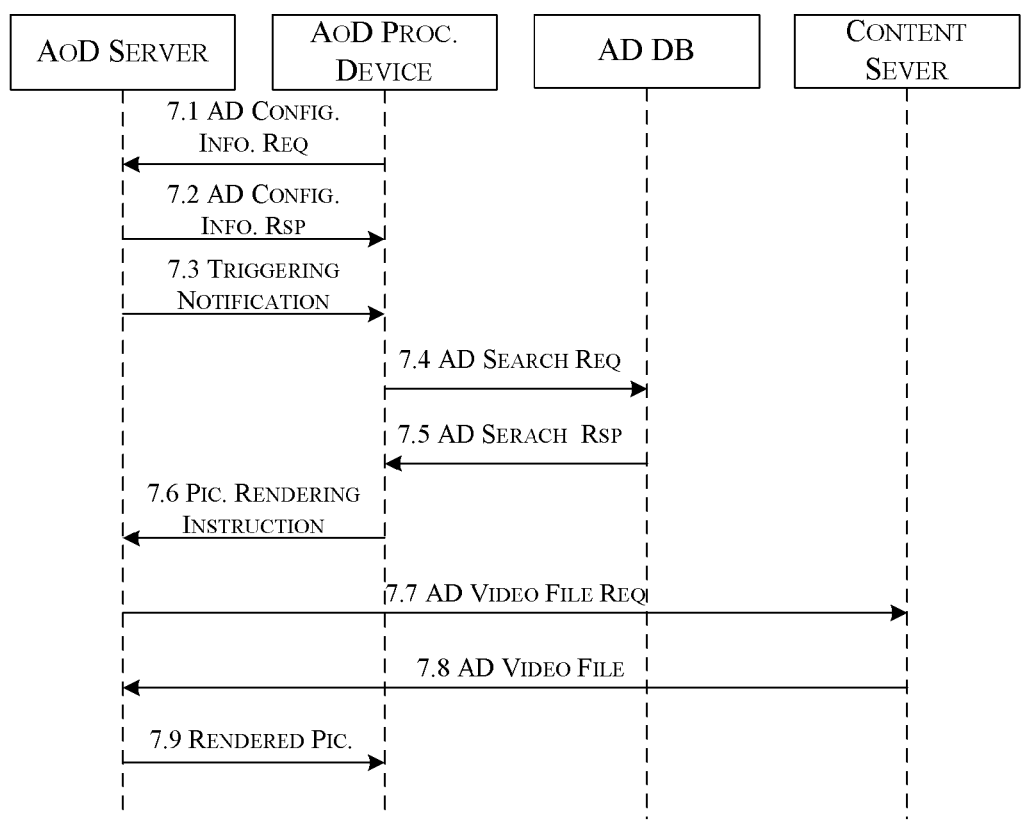
FIG. 7 is a sequence chart illustrating another example of signalling interactions according to an embodiment of the disclosure.

FIG. 7 is a sequence chart illustrating another example of signalling interactions. As shown in FIG. 7, the signalling interactions between the AoD server and the AoD processing device are explained in further detail.

At 7.1, the AoD processing device requests advertisement configuration information from the AoD server. At 7.2, the AoD server responds to the AoD processing device with the advertisement configuration information. For example, the request at 7.1 can be implemented using a message based on HTTP GET method and the response at 7.2 can be implemented using a message based on HTTP 200 OK status code. At 7.3, the AoD server notifies to the AoD processing device that the triggering condition for inserting an advertisement is satisfied. For example, the notification at 7.3 can be implemented using a message based on HTTP POST method. At 7.4, the AoD processing device searches an advertisement database for an advertisement to be inserted based on the advertisement configuration information. At 7.5, the advertisement database returns to the AoD processing device a search result including information on the searched advertisement, e.g., a filename or storage address of its video file. For example, the request at 7.4 can be implemented using a message based on HTTP GET method and the response at 7.5 can be implemented using a message based on HTTP 200 OK status code. At 7.6, the AoD processing device sends to the AoD server an instruction to render combined pictures of the application and the advertisement, along with the information on the advertisement. For example, the instruction at 7.6 can be implemented using a message based on HTTP 200 OK status code. At 7.7, the AoD server requests the video file of the advertisement from a content server where it is stored. At 7.8, the AoD server obtains the video file from the content server. For example, the request at 7.7 can be implemented using a message based on HTTP GET method and the response at 7.8 can be implemented using a message based on HTTP 200 OK status code. Finally at 7.9, the AoD server sends the combined pictures to the AoD processing device.

It is to be noted here that the disclosure is not limited to the specific sequence as described above. For example, the steps 7.4 and 7.5 can be performed prior to the step 7.3. In this case, the AoD processing device can send the information on the searched advertisement to the AoD server immediately after receiving it from the advertisement database and then the steps 7.7 and 7.8 can be performed upon receiving the information, i.e., prior to the steps 7.3 and 7.6.

Figure 8:
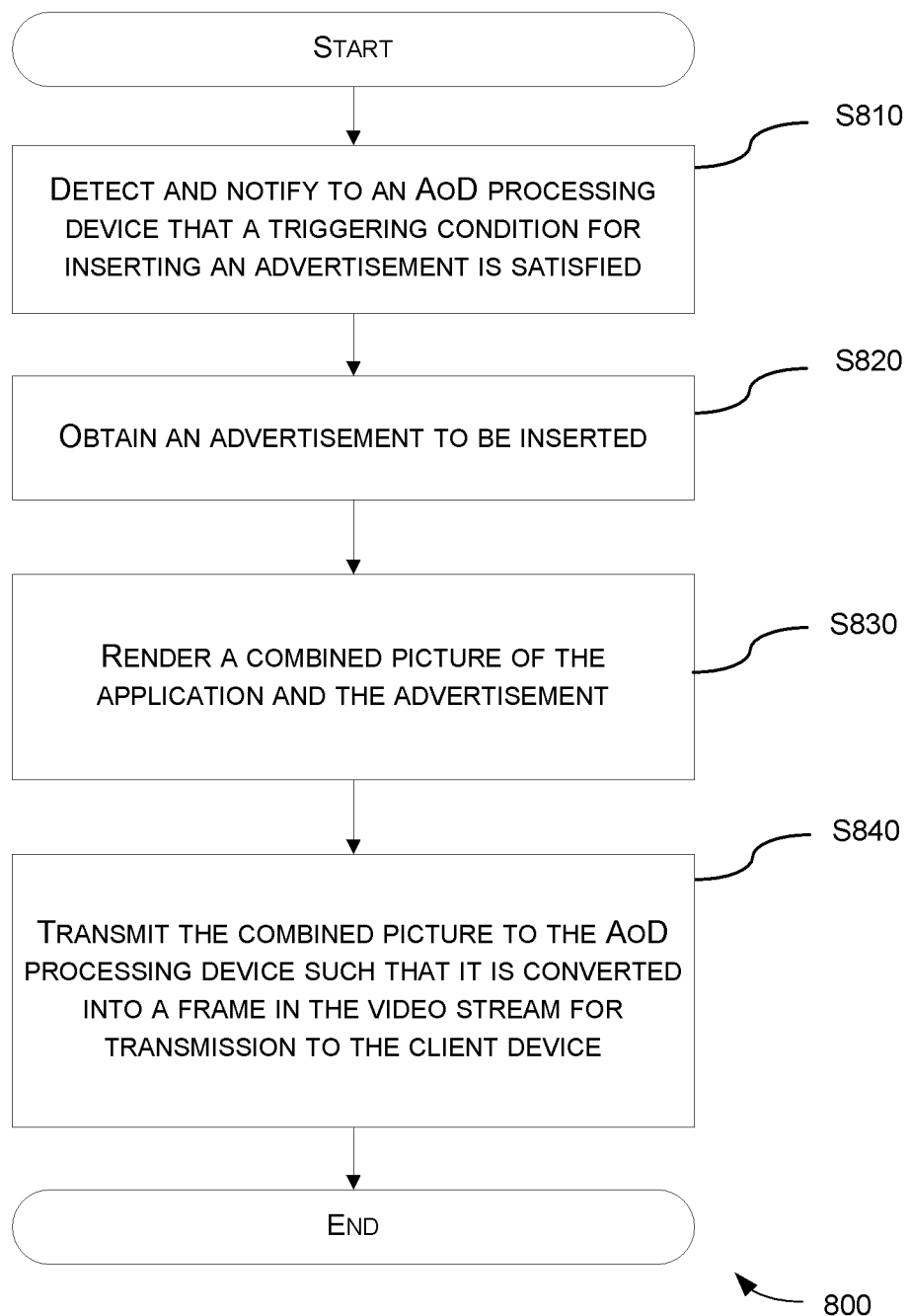
FIG. 8 is a flowchart illustrating another method for inserting an advertisement according to an embodiment of the disclosure.

FIG. 8 is a flowchart illustrating another method 800 for inserting an advertisement into a video stream of an Application on Demand (AoD) service according to an embodiment of the disclosure. Here the AoD service is associated with an application hosted on an AoD server. The method 800 can be performed by the AoD server. The method 800 includes the following steps.

At step S810, the AoD server detects and notifies to an AoD processing device that a triggering condition for inserting an advertisement is satisfied. The triggering condition is associated with an interaction between the AoD server and a client device to which the AoD service is provided. As described above in connection with FIG. 3, the triggering condition is satisfied when: the application is paused by the client device and waits for an input from the client device; the application is loaded or reloaded in response to an interaction with the client device; or an ending picture of the application is to be rendered in response to an interaction with the client device.

At step S820, the AoD server obtains an advertisement to be inserted. As described above in connection with FIG. 7, the AoD server can obtain the advertisement from a content server.

At step S830, the AoD server renders a combined picture of the application and the advertisement. The rendering process has been described above with reference to FIG. 4, for which the description will be omitted here.

At step S840, the AoD server transmits the combined picture to the AoD processing device such that it is converted into a frame in the video stream for transmission to the client device.

Figure 9:
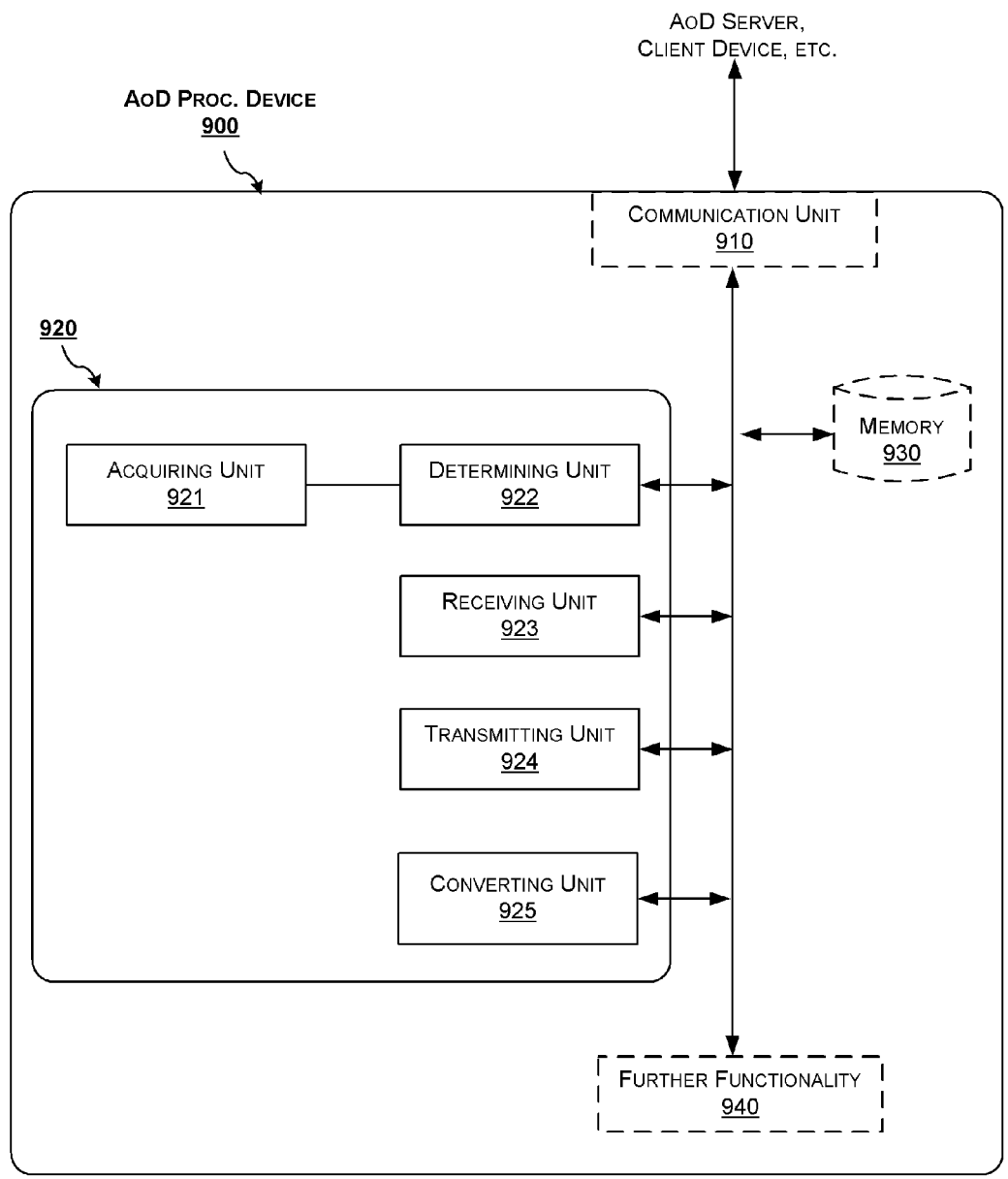
FIG. 9 is a schematic diagram of an AoD processing device according to an embodiment of the disclosure.

FIG. 9 is a schematic diagram of an AoD processing device 900 according to an embodiment of the disclosure.

As shown in FIG. 9, the AoD processing device 900 includes a communication unit 910 for communicating with other entities such as an AoD server and a client device. The AoD processing device 900 further includes an arrangement 920 for implementing the method described above with reference to FIG. 3. The AoD processing device 900 may further comprise one or more memories 930 and one or more further functional units 940, such as a functional unit for advertisement charging.

The arrangement 920 can be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 3. The arrangement 920 may be implemented and/or described as follows.

Referring to FIG. 9, the AoD processing device 900 includes an acquiring unit 921 that acquires advertisement configuration information from the AoD server.

The AoD processing device 900 further includes a determining unit 922 that determines an advertisement to be inserted based on the advertisement configuration information.

The AoD processing device 900 further includes a receiving unit 923 that receives, from the AoD server, a notification that a triggering condition for inserting an advertisement is satisfied. The triggering condition is associated with an interaction between the AoD server and a client device to which the AoD service is provided.

The AoD processing device 900 further includes a transmitting unit 924 that transmits to the AoD server an instruction to cause the AoD server to render a combined picture of the application and the advertisement based on the advertisement configuration information.

The AoD processing device 900 further includes a converting unit 925 that receives, from the AoD server, the combined picture and converts it into a frame in the video stream for transmission to the client device.

In an embodiment, the advertisement configuration information specifies an area in a picture of the application where a picture of the advertisement is to be inserted, and the combined picture is rendered by replacing the area in the picture of the application with the picture of the advertisement.

In an embodiment, the area is represented by coordinates in pixels, width and height.

In an embodiment, the triggering condition is satisfied when: the application is paused by the client device and waits for an input from the client device; the application is loaded or reloaded in response to an interaction with the client device; or an ending picture of the application is to be rendered in response to an interaction with the client device.

In an embodiment, the advertisement is determined further based on a priority dependent on a price its advertiser is willing to pay and/or an associated click-through rate.

In an embodiment, the AoD processing device and the AoD server are implemented on a single physical entity. Alternatively, the AoD processing device and the AoD server can be implemented on separate physical entities.

Figure 10:
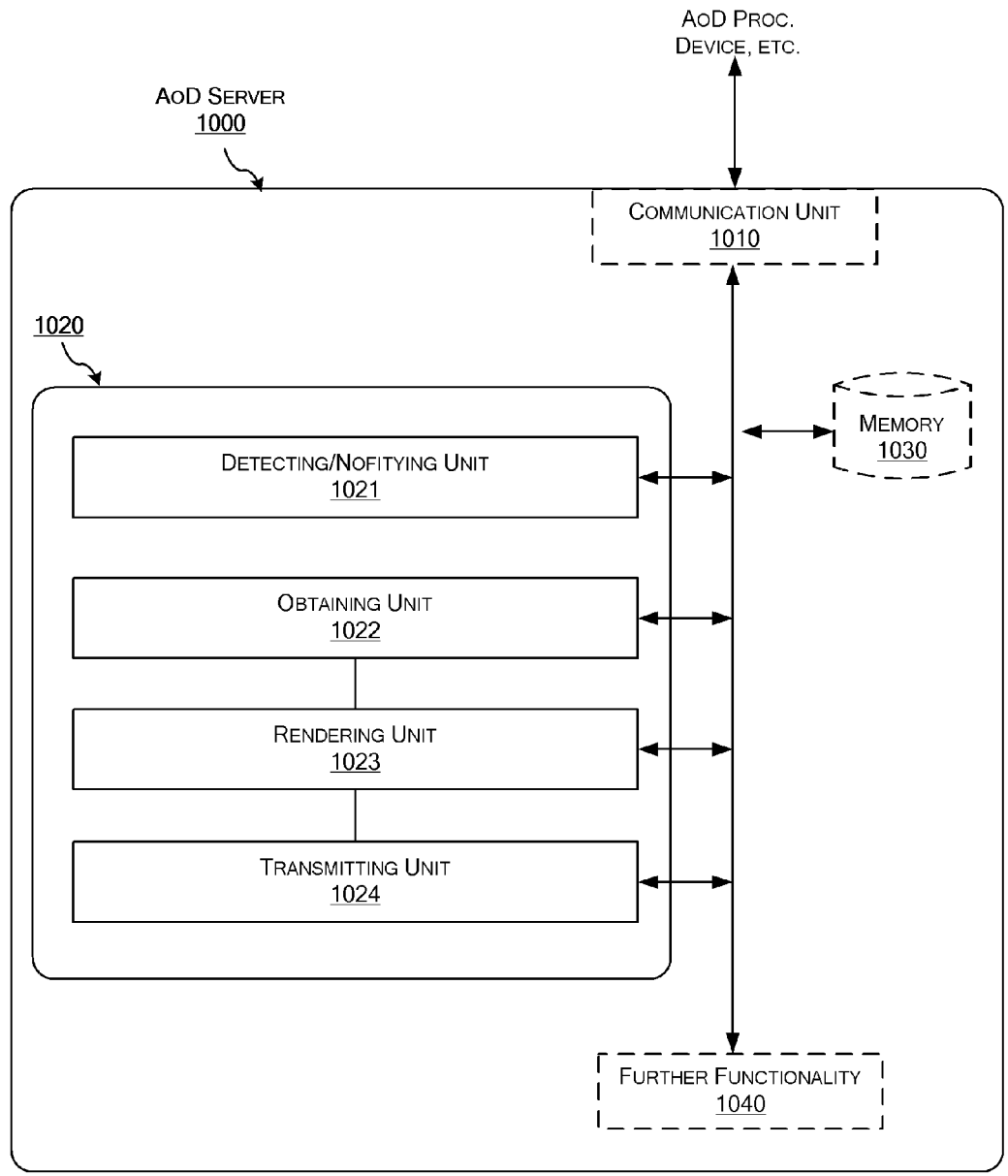
FIG. 10 is a schematic diagram of an AoD server according to an embodiment of the disclosure.

FIG. 10 is a schematic diagram of an AoD server 1000 according to an embodiment of the disclosure.

As shown in FIG. 10, the AoD server 1000 includes a communication unit 1010 for communicating with other entities such as an AoD processing device and a content server. The AoD server 1000 further includes an arrangement 1020 for implementing the method described above with reference to FIG. 8. The AoD server 900 may further comprise one or more memories 1030 and one or more further functional units 1040.

The arrangement 1020 can be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 8. The arrangement 1020 may be implemented and/or described as follows.

Referring to FIG. 10, the AoD server 1000 includes a detecting/notifying unit 1021 that detects and notifies to an AoD processing device that a triggering condition for inserting an advertisement is satisfied. The triggering condition is associated with an interaction between the AoD server and a client device to which the AoD service is provided.

The AoD server 1000 further includes an obtaining unit 1022 that obtains an advertisement to be inserted.

The AoD server 1000 further includes a rendering unit 1023 that renders a combined picture of the application and the advertisement.

The AoD server 1000 further includes a transmitting unit 1024 that transmits the combined picture to the AoD processing device such that it is converted into a frame in the video stream for transmission to the client device.

In an embodiment, the rendering unit 1023 renders the combined picture based on advertisement configuration information specifying an area in a picture of the application where a picture of the advertisement is to be inserted. The rendering unit 1023 renders the combined picture by replacing the area in the picture of the application with the picture of the advertisement.

In an embodiment, the area is represented by coordinates in pixels, width and height.

In an embodiment, the triggering condition is satisfied when: the application is paused by the client device and waits for an input from the client device; the application is loaded or reloaded in response to an interaction with the client device; or an ending picture of the application is to be rendered in response to an interaction with the client device.

Figure 11:
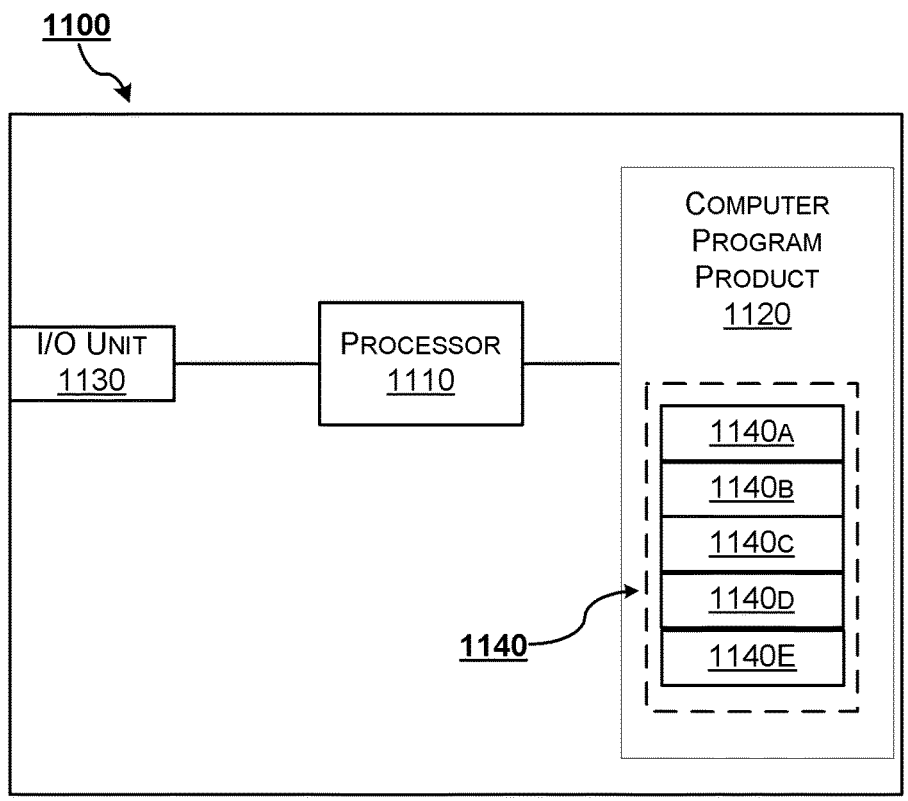
FIG. 11 is a schematic diagram of an arrangement that can be used in an AoD processing device according to an embodiment of the disclosure.

FIG. 11 shows an embodiment of an arrangement 1100 which may be used in the AoD processing device 900. The arrangement 1100 includes a processor 1110, e.g., a Digital Signal Processor (DSP). The processor 1110 may be a single unit or a plurality of units to perform different actions of procedures described herein. The arrangement 1100 may also comprise an input/output unit 1130 for receiving/sending signal from/to other entities.

Furthermore, the arrangement 1100 includes at least one computer program product 1120 in the form of a non-volatile or volatile memory, e.g., an Electrically Erasable Programmable Read-Only Memory (EEPROM), a flash memory and a hard drive. The computer program product 1120 includes a computer program 1140, which includes code/computer readable instructions, which when executed by the processor 1110 in the arrangement 1100 causes the arrangement 1100 and/or the AoD processing device 900 in which it is included to perform the actions, e.g., of the procedure described earlier in conjunction with FIG. 3.

The computer program product 1140 may be configured as a computer program code structured in computer program modules 1140A-1140E.

Hence, in an exemplifying embodiment, the code in the computer program of the arrangement 1100 includes an acquiring module 1140A for acquiring, from the AoD server, advertisement configuration information. The code in the computer program of the arrangement 1100 further includes a determining module 1140B for determining an advertisement to be inserted based on the advertisement configuration information. The code in the computer program of the arrangement 1100 further includes a receiving module 1140C for receiving, from the AoD server, a notification that a triggering condition for inserting an advertisement is satisfied. The triggering condition is associated with an interaction between the AoD server and a client device to which the AoD service is provided. The code in the computer program of the arrangement 1100 further includes a transmitting module 1140D for transmitting to the AoD server an instruction to cause the AoD server to render a combined picture of the application and the advertisement based on the advertisement configuration information. The code in the computer program of the arrangement 1100 further includes a converting module 1140E for receiving, from the AoD server, the combined picture and converting it into a frame in the video stream for transmission to the client device.

The computer program modules could essentially perform the actions of the flow illustrated in FIG. 3, to emulate the arrangement 920 in the AoD processing device 900. In other words, when the different computer program modules are executed in the processor 1110, they may correspond, e.g., to the units 921-925 of FIG. 9.

Although the code means in the embodiments disclosed above in conjunction with FIG. 13 are implemented as computer program modules which when executed in the processing unit causes the device to perform the actions described above in conjunction with the figures mentioned above, at least one of the code means may in alternative embodiments be implemented at least partly as hardware circuits.

Figure 12:
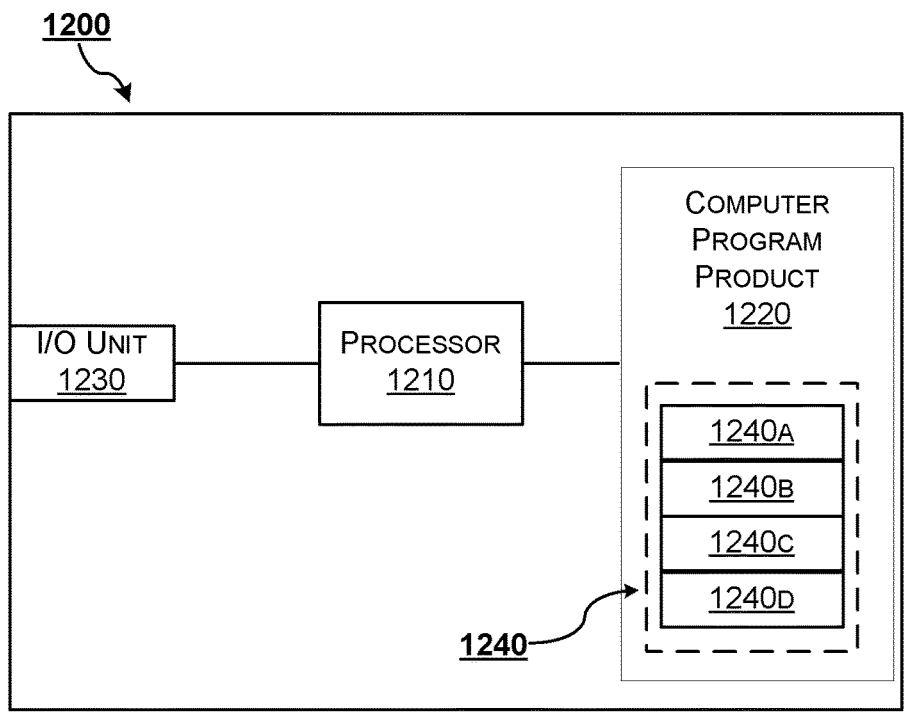
FIG. 12 is a schematic diagram of an arrangement that can be used in an AoD server according to an embodiment of the disclosure.

FIG. 12 shows an embodiment of an arrangement 1200 which may be used in the AoD server 1000. The arrangement 1200 includes a processor 1210, e.g., a Digital Signal Processor (DSP). The processor 1210 may be a single unit or a plurality of units to perform different actions of procedures described herein. The arrangement 1200 may also comprise an input/output unit 1230 for receiving/sending signal from/to other entities.

Furthermore, the arrangement 1200 includes at least one computer program product 1220 in the form of a non-volatile or volatile memory, e.g., an Electrically Erasable Programmable Read-Only Memory (EEPROM), a flash memory and a hard drive. The computer program product 1220 includes a computer program 1240, which includes code/computer readable instructions, which when executed by the processor 1210 in the arrangement 1200 causes the arrangement 1200 and/or the AoD server 1000 in which it is included to perform the actions, e.g., of the procedure described earlier in conjunction with FIG. 8.

The computer program product 1240 may be configured as a computer program code structured in computer program modules 1240A-1240D.

Hence, in an exemplifying embodiment, the code in the computer program of the arrangement 1200 includes a detecting/notifying module 1240A for detecting and notifying to an AoD processing device that a triggering condition for inserting an advertisement is satisfied. The triggering condition is associated with an interaction between the AoD server and a client device to which the AoD service is provided. The code in the computer program of the arrangement 1200 further includes an obtaining module 1240B for obtaining an advertisement to be inserted. The code in the computer program of the arrangement 1200 further includes a rendering module 1240C for rendering a combined picture of the application and the advertisement. The code in the computer program of the arrangement 1200 further includes a transmitting module 1240D for transmitting the combined picture to the AoD processing device such that it is converted into a frame in the video stream for transmission to the client device.

The computer program modules could essentially perform the actions of the flow illustrated in FIG. 8, to emulate the arrangement 1020 in the AoD server 1000. In other words, when the different computer program modules are executed in the processor 1210, they may correspond, e.g., to the units 1021-1024 of FIG. 10.

Although the code means in the embodiments disclosed above in conjunction with FIGS. 11 and 12 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method performed by an Application on Demand (AoD) processing device for inserting an advertisement into a video stream of an AoD service associated with an application hosted on an AoD server, the method comprising steps of:
   acquiring, from the AoD server, advertisement configuration information;
   determining an advertisement to be inserted based on the advertisement configuration information;
   receiving a notification transmitted by the AoD server indicating that a triggering condition for inserting an advertisement is satisfied, the triggering condition being associated with an interaction between the AoD server and a client device to which the AoD service is provided;
   as a result of receiving the notification, transmitting to the AoD server an instruction to cause the AoD server to render a combined picture of the application and the advertisement based on the advertisement configuration information; and
   receiving the combined picture from the AoD server and converting the combined picture into a frame in the video stream for transmission to the client device.

2. The method of claim 1, wherein
   the advertisement configuration information specifies an area in a picture of the application where a picture of the advertisement is to be inserted, and
   the combined picture is rendered by replacing the area in the picture of the application with the picture of the advertisement.

3. The method of claim 2, wherein the area is represented by coordinates in pixels, width and height.

4. The method of claim 1, wherein the triggering condition is satisfied when:
   the application is paused by the client device and waits for an input from the client device;
   the application is loaded or reloaded in response to an interaction with the client device; or an ending picture of the application is to be rendered in response to an interaction with the client device.

5. The method of claim 1, wherein the advertisement is determined further based on one or more of a priority dependent on a price its advertiser is willing to pay and an associated click-through rate.

6. The method of claim 1, wherein the AoD processing device and the AoD server are implemented on a single physical entity.

7. The method of claim 1, wherein the AoD processing device and the AoD server are implemented on separate physical entities.

8. A method performed by an Application on Demand (AoD) server for inserting an advertisement into a video stream of an AoD service associated with an application hosted on the AoD server, the method comprising steps of:
   detecting, by the AoD server, that a triggering condition for inserting an advertisement is satisfied;
   the AoD server transmitting a notification to an AoD processing device indicating that the triggering condition for inserting an advertisement is satisfied, the triggering condition being associated with an interaction between the AoD server and a client device to which the AoD service is provided;
   the AoD server obtaining an advertisement to be inserted;
   the AoD server rendering a combined picture of the application and the advertisement; and
   the AoD server transmitting the combined picture to the AoD processing device such that it is converted into a frame in the video stream for transmission to the client device.

9. The method of claim 8, wherein
   said rendering is performed based on advertisement configuration information specifying an area in a picture of the application where a picture of the advertisement is to be inserted, and
   said rendering comprises replacing the area in the picture of the application with the picture of the advertisement.

10. The method of claim 9, wherein the area is represented by coordinates in pixels, width and height.

11. The method of claim 8, wherein the triggering condition is satisfied when:
   the application is paused by the client device and waits for an input from the client device;
   the application is loaded or reloaded in response to an interaction with the client device; or
   an ending picture of the application is to be rendered in response to an interaction with the client device.

12. An Application on Demand (AoD) processing device comprising a processor and a memory, said memory containing instructions executable by said processor whereby said AoD processing device is operative to insert an advertisement into a video stream of an AoD service associated with an application hosted on an AoD server by:
   acquiring, from the AoD server, advertisement configuration information;
   determining an advertisement to be inserted based on the advertisement configuration information;
   receiving a notification transmitted by the AoD server indicating that a triggering condition for inserting an advertisement is satisfied, the triggering condition being associated with an interaction between the AoD server and a client device to which the AoD service is provided;
   as a result of receiving the notification, transmitting to the AoD server an instruction to cause the AoD server to render a combined picture of the application and the advertisement based on the advertisement configuration information; and
   receiving the combined picture from the AoD server and converting the combined picture into a frame in the video stream for transmission to the client device.

13. The AoD processing device of claim 12, wherein
   the advertisement configuration information specifies an area in a picture of the application where a picture of the advertisement is to be inserted, and
   the combined picture is rendered by replacing the area in the picture of the application with the picture of the advertisement.

14. The AoD processing device of claim 13, wherein the area is represented by coordinates in pixels, width and height.

15. The AoD processing device of claim 12, wherein the triggering condition is satisfied when:
   the application is paused by the client device and waits for an input from the client device;
   the application is loaded or reloaded in response to an interaction with the client device; or
   an ending picture of the application is to be rendered in response to an interaction with the client device.

16. The AoD processing device of claim 12, wherein the advertisement is determined further based on one or more of a priority dependent on a price its advertiser is willing to pay and an associated click-through rate.

17. The AoD processing device of claim 12, wherein the AoD processing device and the AoD server are implemented on a single physical entity.

18. The AoD processing device of claim 12, wherein the AoD processing device and the AoD server are implemented on separate physical entities.

19. An Application on Demand (AoD) server comprising a processor and a memory, said memory containing instructions executable by said processor whereby said AoD server is operative to insert an advertisement into a video stream of an AoD service associated with an application hosted on the AoD server by:
   detecting that a triggering condition for inserting an advertisement is satisfied;
   transmitting a notification to an AoD processing device indicating that the triggering condition for inserting an advertisement is satisfied, the triggering condition being associated with an interaction between the AoD server and a client device to which the AoD service is provided;
   obtaining an advertisement to be inserted;
   rendering a combined picture of the application and the advertisement; and
   transmitting the combined picture to the AoD processing device such that it is converted into a frame in the video stream for transmission to the client device.

20. The AoD server of claim 19, wherein
   said rendering is performed based on advertisement configuration information specifying an area in a picture of the application where a picture of the advertisement is to be inserted, and
   said rendering comprises replacing the area in the picture of the application with the picture of the advertisement.

21. The AoD server of claim 20, wherein the area is represented by coordinates in pixels, width and height.

22. The AoD server of claim 19, wherein the triggering condition is satisfied when:
   the application is paused by the client device and waits for an input from the client device;

the application is loaded or reloaded in response to an interaction with the client device; or an ending picture of the application is to be rendered in response to an interaction with the client device.

23. A computer program product comprising a non-transitory computer readable storage medium storing the computer program, wherein the computer program comprises computer readable instructions which, when run on an Application on Demand (AoD) processing device, cause the AoD processing device to insert an advertisement into a video stream of an AoD service associated with an application hosted on an AoD server, by:

acquiring, from the AoD server, advertisement configuration information;

determining an advertisement to be inserted based on the advertisement configuration information;

receiving a notification transmitted by the AoD server indicating that a triggering condition for inserting an advertisement is satisfied, the triggering condition being associated with an interaction between the AoD server and a client device to which the AoD service is provided;

as a result of receiving the notification, transmitting to the AoD server an instruction to cause the AoD server to render a combined picture of the application and the advertisement based on the advertisement configuration information; and receiving the combined picture from the AoD server and converting the combined picture into a frame in the video stream for transmission to the client device.

24. A computer program product comprising a non-transitory computer readable storage medium storing the computer program, wherein the computer program comprises computer readable instructions which, when run on an Application on Demand (AoD) server, cause the AoD server to insert an advertisement into a video stream of an AoD service associated with an application hosted on the AoD server by:

detecting that a triggering condition for inserting an advertisement is satisfied;

transmitting a notification to an AoD processing device indicating that the triggering condition for inserting an advertisement is satisfied, the triggering condition being associated with an interaction between the AoD server and a client device to which the AoD service is provided;

obtaining an advertisement to be inserted;

rendering a combined picture of the application and the advertisement; and transmitting the combined picture to the AoD processing device such that it is converted into a frame in the video stream for transmission to the client device.

* * * * *